Patented Mar. 8, 1949

2,464,120

UNITED STATES PATENT OFFICE 2,464,120

POLYMERS OF ALPHA-FLUOROACETOXY-ACRYLONITRILE COMPOUNDS

Joseph B. Dickey and Theodore E. Stanin, Rochester, N. Y., assignors to Eastman Kodak Company, Rochester, N. Y., a corporation of New Jersey No Drawing. Application March 14, 1946,
Serial No. 654,525

8 Claims. (Cl. 260—83)

This invention relates to polymeric fluoroacetoxy compounds and more particularly to poly-alpha-fluoroacetoxyacrylonitriles. It also relates to a process for their preparation.

In the preparation of our new polymeric compounds, a fluoroacetoxyacrylonitrile of the general formula:

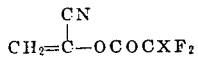

wherein X represents a member selected from the group consisting of a hydrogen atom, a fluorine atom or a chlorine atom is polymerized alone or in admixture with one or more other polymerizable monomeric unsaturated compounds such as vinyl chloride, vinylidene chloride, vinyl acetate, vinyl propionate, styrene, p-cyanostyrene, o-acetaminostyrene, p-sulfamidostyrene, methylmethacrylate, methylacrylate, vinyl methylketone, vinyl methyl sulfone, vinyl sulfonamide, vinyl ethyl ether, isobutylene, acrylonitrile, amides, esters and half-nitriles of maleic and fumaric acids, and the like, in the presence of a polymerization catalyst, for example, benzoyl peroxide, acetyl peroxide, an alkali metal peroxide, an alkali metal persulfate or hydrogen peroxide. The polymerizations are facilitated by heat and can be carried out under normal or higher pressures in mass, in emulsion conditions or in beads. The monomeric fluoroacetoxyacrylonitriles employed in the practice of our invention can be obtained, for example, by condensing a beta-halo-alpha-hydroxypropionitrile such as beta-chloro-alpha-hydroxypropionitrile with a fluoroacetic acid or anhydride, for example, trifluoroacetic anhydride, difluoroacetic anhydride or difluorochloroacetic anhydride. The preparation of these monomeric compounds are described and claimed in our copending application, Serial No. 654,523, filed of even date herewith. Our new resinous compounds are characterized by having higher melting points and greater resistane to heat than the resins obtained from polymerizing non-halogenated acetoxyacrylonitriles. The new resins of our invention are valuable for making molded objects, sheeting materials and compositions, and also as intermediates for preparing other resins by conversion of the nitrile groups to carboxylic, amido, ester and similar groups.

It is, accordingly, an object of our invention to provide new polymeric fluoroacetoxyacrylonitrile compounds. A further object is to provide a process for their preparation. Other objects will become apparent hereinafter.

The following examples will serve to illustrate further our invention:

*Example I.—Preparation of alpha-trifluoroacetoxyacrylonitrile*

50 grams of beta-chloro-alpha-hydroxypropionitrile and 150 grams of trifluoroacetic anhydride were reacted together on a water bath. On distillation there was obtained a good yield of beta-chloro-alpha-trifluoroacetoxy propionitrile. This compound was then treated with an excess of diethylaniline from which mixture by fractionation there was obtained a good yield of alpha-trifluoroacetoxyacrylonitrile:

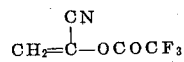

In place of trifluoroacetic anhydride in the above example, there can be substituted difluoroacetic anhydride or difluorochloroacetic anhydride to give the corresponding alpha-difluoroacetoxyacrylonitrile and alpha-difluorochloroacetoxyacrylonitrile.

*Example II.—Poly-alpha-trifluoroacetoxyacrylonitrile*

10 grams of alpha-trifluoroacetoxyacrylonitrile were polymerized at about 50° C., in the presence of 0.01 gram of benzoyl peroxide. The product obtained was a yellowish colored, tough solid. The alpha - difluoroacetoxyacrylonitrile and the alpha-difluorochloroacetoxyacrylonitrile can be polymerized in similar manner to obtain resinous solids characterized by higher melting points and greater stability to heat. By subjecting the polymer to hydrolyzing conditions, there were obtained resins containing various amounts of nitrile and carboxylic groups in the molecule. The corresponding amides and esters can be prepared from the hydrolyzed polymers.

*Example III.—Copolymer of alpha-trifluoroacetoxyacrylonitrile and vinyl chloride*

10 grams of alpha-trifluoroacetoxyacrylonitrile and 1.5 grams of vinyl chloride were polymerized together, using 0.01 gram of benzoyl peroxide as a catalyst. The product was a yellowish colored resinous solid.

*Example IV.—Copolymer of alpha-difluoroacetoxyacrylonitrile and methylmethacrylate*

15 grams of alpha-difluoroacetoxyacrylonitrile and 10 grams of methylmethacrylate were polymerized at about 50° C., using 0.1 per cent by weight of benzoyl peroxide. A bright, clear, moldable plastic was obtained.

Example V.—Copolymers of alpha-trifluoro-acetoxyacrylonitrile and styrene 1 gram of alpha-trifluoroacetoxyacrylonitrile and 10 grams of styrene were polymerized together at 50° C., in the presence of about 0.01 gram of benzoyl peroxide. There was obtained a slightly yellow colored, tough solid, which was soluble in acetone and readily compression molded into buttons. By increasing the proportion of alpha-trifluoroacetoxyacrylonitrile to styrene in the starting mixtures, there were obtained copolymers having a larger proportion of carboxyl groups, which were transformable to corresponding amides and esters. Useful copolymers were obtained with starting mixtures having about from 1 to 9 grams of alpha-trifluoroacetoxyacrylonitrile and about from 9 to 1 grams of styrene.

Many of our polymers and products closely related thereto can be extruded in the form of wires, rods, tubes and sheets, or molded by the usual compression or injection processes. Fillers, coloring materials and plasticizers can be added. In the usual practice the polymer is first softened by heat, fillers added if desired, and then kneaded, rolled, compressed or drawn to the desired form or shape. The polymers of the invention can also be transformed into useful films and sheets by making a solution of the polymer in a suitable solvent, and then casting the solution on a film-forming surface such as a glass or metal plate or revolving roll or drum, allowing the cast film to dry, and stripping the film from the surface. Solutions of the polymers can also be extruded in the form of fine thread into a drying atmosphere or a precipitating bath.

While the examples have indicated certain specific proportions of monomeric fluoroacetoxyacrylonitriles reacting with monomeric vinyl compounds to form copolymers, the proportions can be varied within comparatively wide limits. For example, useful copolymers of alpha-trifluoroacetoxyacrylonitrile and methylmethacrylate can be obtained with starting proportions from about 1 to 99 molecular parts of the acrylonitrile and from about 99 to 1 molecular parts of the vinyl compound, the products obtained varying somewhat in chemical and physical properties, in accordance with the amount of the respective groups in the molecules.

What we claim is:

1. The polymers obtained by polymerization of a compound having the general formula:

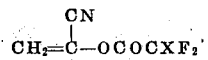

wherein X represents a member selected from the group consisting of a hydrogen atom, a fluorine atom and a chlorine atom.

2. Poly-alpha-trifluoroacetoxyacrylonitrile.

3. The process of preparing a polymeric fluoroacetoxyacrylonitrile comprising heating a compound having the general formula:

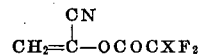

wherein X represents a member selected from the group consisting of a hydrogen atom, a fluorine atom and a chlorine atom, in the presence of a polymerization catalyst.

4. The process of preparing poly-alpha-trifluoroacetoxyacrylonitrile comprising heating alpha-trifluoroacetoxyacrylonitrile, in the presence of benzoyl peroxide.

5. The copolymer obtained by polymerization of a mixture including from 1 to 99 molecular parts of alpha-trifluoroacetoxy acrylonitrile and from 99 to 1 molecular parts of vinyl chloride.

6. The copolymer obtained by polymerization of a mixture including from 1 to 99 molecular parts of alpha-trifluoroacetoxy acrylonitrile and from 99 to 1 molecular parts of styrene.

7. The process which comprises heating a mixture including from 1 to 99 molecular parts of alpha-trifluoroacetoxy acrylonitrile and from 99 to 1 molecular parts of vinyl chloride, in the presence of a polymerization catalyst.

8. The process which comprises heating a mixture including from 1 to 99 molecular parts of alpha-trifluoroacetoxy acrylonitrile and from 99 to 1 molecular parts of styrene, in the presence of a polymerization catalyst.

JOSEPH B. DICKEY.
THEODORE E. STANIN.

REFERENCES CITED

The following references are of record in the file of this patent:

UNITED STATES PATENTS

| Number | Name | Date |
| --- | --- | --- |
| 2,266,771 | Lange et al. | Dec. 23, 1941 |